Feb. 18, 1936.     F. H. BENDER ET AL     2,031,093
WHEEL AND AXLE ASSEMBLY
Filed April 8, 1931
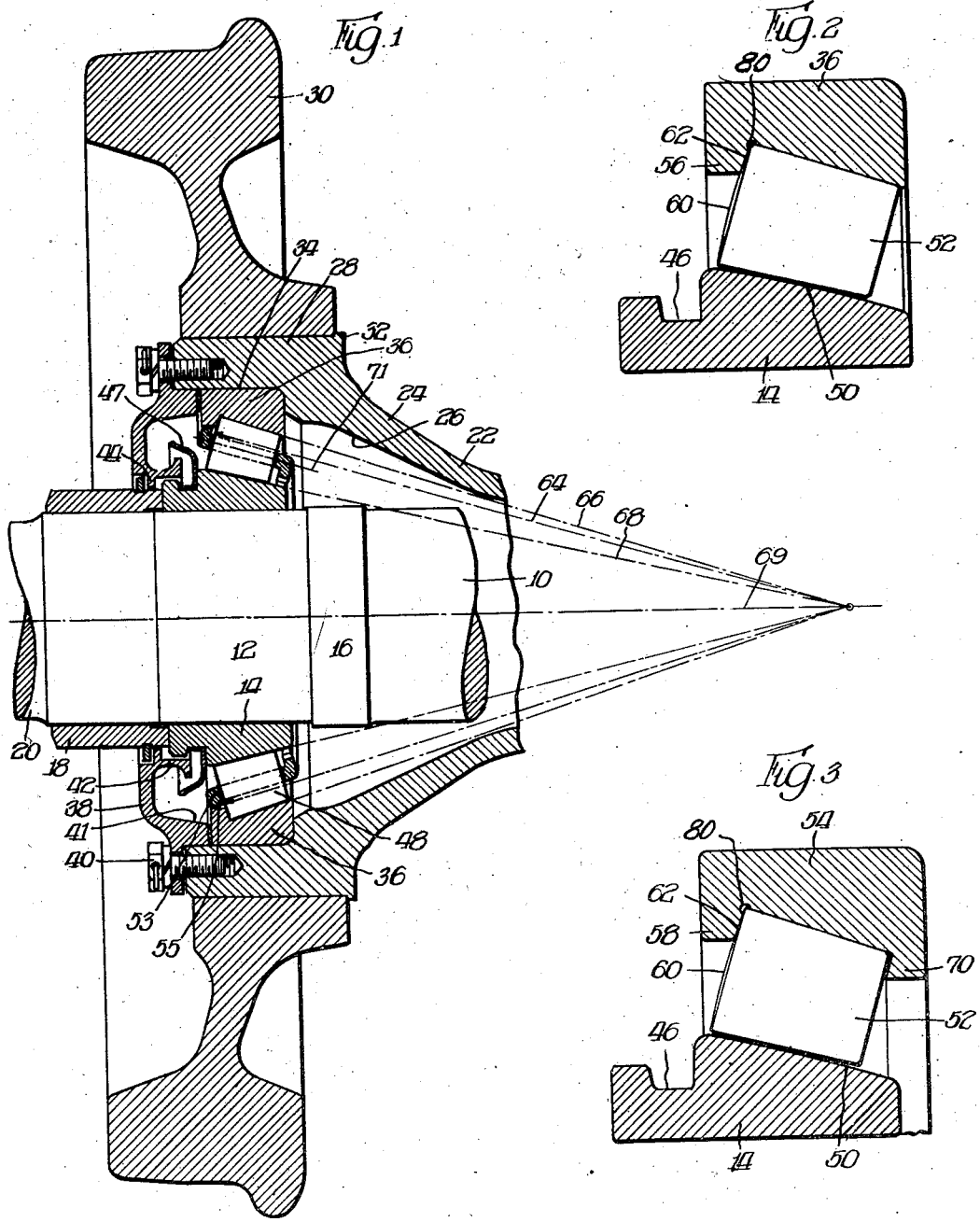
Inventors:
Frederic H. Bender,
Fred E. Bachman Patented Feb. 18, 1936

2,031,093

UNITED STATES PATENT OFFICE 2,031,093

WHEEL AND AXLE ASSEMBLY

Frederic H. Bender and Fred E. Bachman, Chicago, Ill., assignors to American Steel Foundries, Chicago, Ill., a corporation of New Jersey Application April 8, 1931, Serial No. 528,549

6 Claims. (Cl. 308—214)

This invention pertains to anti-friction bearings, and more particularly to the application of anti-friction bearings to railway wheel and axle assemblies.

In roller bearings of the type to be herein described it is found that in operation the rollers have a tendency to move outwardly of the assembly in operation. In order to counteract this movement and in order to take end thrust on the roller bearing assemblies, a thrust shoulder is provided on one or the other of the race rings to accommodate thrust between the race rings and the rollers. Also, in order to provide for the proper contact between the rollers and the races, they must be proportioned so that the co-operating surfaces between the thrust shoulder and the rollers are properly curved.

An object of this invention is to relieve the rollers of the weight of the retainer and therefore avoid the undesired friction of the load carrying parts.

Another object of the invention is to provide a wheel and axle assembly having anti-friction bearings wherein structure is provided to properly space the rollers, yet will permit free rolling operation of the anti-friction members.

Yet another object of the invention is to provide anti-friction bearings wherein a spacing member, while moved by a portion of the assembly, still permits free operation of the anti-friction members.

Still another object of the invention is to provide an anti-friction bearing assembly wherein relative movements of portions of the assembly are permitted, but free operation of the anti-friction members is insured.

A further object is to provide a roller bearing assembly wherein co-operating thrust surfaces are provided on the rollers and races, making a true thrust contact between the races and the rollers.

With these and various other objects in view, the invention may consist of certain novel features of construction and operation, as will be more fully described and particularly pointed out in the specification, drawing, and claims appended hereto.

In the drawing, which illustrates an embodiment of the device and wherein like reference characters are used to designate like parts—

Figure 1 is a fragmentary sectional elevation through a wheel and axle assembly showing the application thereto of one form of anti-friction bearing embodying the invention;

Figure 2 is an enlarged fragmentary sectional elevation through the anti-friction bearings shown in Figure 1; and Figure 3 is an enlarged fragmentary sectional elevation through a modified form of anti-friction Referring first of all more particularly to Figure 1, the inner normally non-rotatable axle 10 is provided with a bearing receiving portion 12 on which the cone 14 of the anti-friction bearing assembly is mounted, the axle being provided with a shoulder 16 against which or adjacent which the cone is disposed, depending on the particular application of the bearings. The cone is maintained in operative position by means of a shrink collar 18, and the inner axle is provided with an outwardly extending bearing portion 20 adapted to have cooperative relation with the usual brasses and wedges in the standard A. R. A. journal box. It is of course to be understood that the axle 10 may be associated with any form of journal box or in direct co-operation with a side frame of a truck, and may be wholly fixed, floating or semi-floating, and may or may not have vertical, lateral or other movements with respect to the adjacent truck frame.

The outer casing or revoluble axle 22 is provided with a flared portion 24 forming a lubricant recess 26, the axle terminating in a wheel hub portion 28 on which a wheel 30 is mounted, the wheel being limited in its inward position on the hub portion by means of the shoulder 32. The lubricant recess terminates in a bearing recess 34 in which the cup 36 is mounted, the recess being closed by means of the cover plate 38 secured in position on the casing by means of bolts 40, the cover plate being provided with an inwardly extending portion 41 which may serve to position the cup. The cover plate is provided with a lubricant conducting channel 42 and baffle means 44 formed partially with means movably disposed on the shrink ring. The cone 14 forms a part of the baffle means and is also provided with a lubricant conducting channel 46 which may or may not accommodate a baffle 47 overlying the channel 42. The anti-friction bearings 48 are of the self-aligning dual duty type for carrying both axial and radial loads, the bearing portion 50 of the cone being made up of convexed elements co-operating with the straight line elements of the frusto-conical roller bearings 52. The cage 53 spaces the rollers and is provided with an outwardly directed flange 55 urged to rotate the cage by the thrust shoulder of the outer race ring in order to facilitate rotation of the assembly.

The cup 36 and the cup 54, of the modification shown in Figure 3, are each provided with straight line elements contacting the bearing surface of the rollers substantially throughout their bearing length. In each case the cups are provided adjacent the large ends of the rollers with thrust shoulders 56 and 58. The large ends of the rollers which are disposed outwardly of the assembly are provided with spherical bearing surfaces 60 adapted to have bearing co-operation with correspondvided on the thrust shoulders 56 and 58. The radius 64 of these spherical surfaces is defined by the intersection of the prolongations 66 and 68 of the cone elements contacting the center line 69 of the bearing assembly and inner axle and also the center line 71 of the rollers. For practical purposes the spherical surface of the thrust shoulder and the base of the cone may be replaced by a conical surface of such shape that an element of such right cone would be tangent to an arc formed by the radius 64 which approximates the center line of the contacting surfaces desired.

In the modification shown in Figure 3 the cup is provided with a rib or flange 70 adjacent the small or inner end of the rollers, thereby forming virtually a channel surface in the cup in which the rollers operate.

Due to the general characteristics of this bearing, the tapered roller will run with more or less pressure against the guiding flange adjacent to the large end of the roller when the bearing is carrying load. The distance between the guiding flanges between which the rollers run is made slightly greater than the length of the roller so as to provide running clearance as required for various sizes and capacities of bearings. While this running clearance between the cup flanges prevents actual contact of the roller with both guiding flanges simultaneously, the amount of clearance is limited so that the roller is definitely guided against oscillation.

It will be noted that the cup is provided with a cut out portion 80 preventing stress concentration at the corners of the rollers, especially when deflection takes place, it being seen that normally the edges of the large ends of the rollers are clear of the races. Substantially the same effect may be gotten by slightly beveling or rounding the large end of the rollers. The cut out portion 80 makes for a better grinding job too, as it is difficult to exactly grind squared or angular surfaces. In structures as shown in Figure 3, the cup at the small end of the roller may also be cut out as at 80, or the roller end may be rounded or beveled.

It is to be understood that we do not wish to be limited by the exact embodiments of the device shown, which are merely by way of illustration and not limitation, as various and other forms of the device will of course be apparent to those skilled in the art without departing from the spirit of the invention or the scope of the claims.

I claim:

1. The combination of relatively fixed and rotatable members, anti-friction bearings therebetween, said bearings including inner and outer race rings, frusto-conical rollers disposed between said race rings sloping outwardly of said assembly and away from said inner race ring, the large ends of said rollers disposed outwardly, a cage spacing said rollers and urged to rotary movement by said outer race ring, the inner race ring having a convexed bearing surface, the outer race ring having a bearing surface of straight line elements and being provided with a thrust shoulder adjacent the outer end, each of said rollers having a spherical bearing surface contacting a complementary spherical surface formed on said thrust shoulder.

2. The combination of relatively fixed and rotatable members, anti-friction bearings therebetween, said bearings including inner and outer race rings, frusto-conical rollers disposed between said race rings sloping outwardly of said assembly and away from said inner race ring, the large ends of said rollers disposed outwardly, a cage spacing said rollers and urged to rotary movement by said outer race ring, the inner race ring having a convexed bearing surface, the outer race ring having a bearing surface of straight line elements and being provided with spaced shoulders embracing a portion of said rollers, each of said rollers having a spherical bearing surface contacting a complementary spherical surface formed on one of said shoulders.

3. The combination of relatively fixed and rotatable members, anti-friction bearings therebetween, said bearings including inner and outer race rings, frusto-conical rollers disposed between said race rings sloping outwardly of said assembly and away from said inner race ring, the large ends of said rollers disposed outwardly, a cage spacing said rollers and urged to rotary movement by said outer race ring, the inner race ring having a convexed bearing surface, the outer race ring having a bearing surface of straight line elements and being provided with spaced shoulders embracing a portion of said rollers, each of said rollers having a spherical bearing surface contacting a complementary spherical surface formed on the outer of said shoulders.

4. The combination of relatively fixed and rotatable members, anti-friction bearings therebetween, said bearings including inner and outer race rings, frusto-conical rollers disposed between said race rings sloping outwardly of said assembly and away from said inner race ring, the large ends of said rollers disposed outwardly, a cage spacing said rollers and urged to rotary movement by said outer race ring, the inner race ring having a convexed bearing surface, the outer race ring having a bearing surface of straight line elements and being provided with a thrust shoulder adjacent the outer end, each of said rollers having a spherical bearing surface contacting a complementary spherical surface formed on said thrust shoulder, the projections of the bearing elements of said rollers intersecting the center line of said bearing and determining the radius of the spherical surfaces of said rollers.

5. The combination of relatively fixed and rotatable members, anti-friction bearings therebetween, said bearings including inner and outer race rings, rollers disposed between said race rings, one of said race rings contacting said rollers over a portion of the bearing length thereof, the outer race ring having shoulders at each end of the bearing surface thereof, the junction of the shoulders and bearing surface of said outer race ring being cut out adjacent one of the ends of the rollers.

6. The combination of relatively fixed and rotatable members, anti-friction bearings therebetween, said bearings including inner and outer race rings, rollers disposed between said race rings, one of said race rings contacting said rollers over a portion of the bearing length thereof, the outer race ring having shoulders at each end of the bearing surface thereof, the rollers having bearing surfaces adjacent said shoulders.

FREDERIC H. BENDER.
FRED E. BACHMAN.